United States Patent
Kato

(10) Patent No.: US 9,543,871 B2
(45) Date of Patent: Jan. 10, 2017

(54) MOTOR-DRIVEN APPLIANCE

(71) Applicant: MAKITA CORPORATION, Anjo-shi, Aichi (JP)

(72) Inventor: Itsuku Kato, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 143 days.

(21) Appl. No.: 14/449,456

(22) Filed: Aug. 1, 2014

(65) Prior Publication Data

US 2015/0042254 A1 Feb. 12, 2015

(30) Foreign Application Priority Data

Aug. 7, 2013 (JP) ................. 2013-164267

(51) Int. Cl.

| | |
|---|---|
| G05B 5/00 | (2006.01) |
| H02H 7/08 | (2006.01) |
| H02P 1/00 | (2006.01) |
| H02P 7/06 | (2006.01) |
| G05B 6/02 | (2006.01) |
| H02P 27/08 | (2006.01) |
| H02P 7/29 | (2016.01) |
| B23D 51/16 | (2006.01) |
| H02P 31/00 | (2006.01) |

(52) U.S. Cl.
CPC ............... *H02P 7/06* (2013.01); *B23D 51/16* (2013.01); *G05B 6/02* (2013.01); *H02P 7/2913* (2013.01); *H02P 27/08* (2013.01); *H02P 31/00* (2013.01); *Y02P 70/187* (2015.11)

(58) Field of Classification Search
CPC ............... H02P 7/06; B23D 51/16; G05B 6/02
USPC ........................................... 318/458
See application file for complete search history.

(56) References Cited

U.S. PATENT DOCUMENTS

| | | | |
|---|---|---|---|
| 5,666,463 A | 9/1997 | Schwartz et al. | |
| 2011/0284256 A1* | 11/2011 | Iwata ................. | B25F 5/00 173/176 |

(Continued)

FOREIGN PATENT DOCUMENTS

| | | |
|---|---|---|
| DE | 4421105 A1 | 5/1995 |
| DE | 19615441 C1 | 10/1997 |
| JP | A-60-77694 | 5/1985 |

OTHER PUBLICATIONS

Sep. 13, 2016 Office Action issued in German Patent Application No. 10 2014 011 493.7.

*Primary Examiner* — Erick Glass
(74) *Attorney, Agent, or Firm* — Oliff PLC

(57) ABSTRACT

A motor-driven appliance of one aspect of the present disclosure includes a motor and a controller. The controller includes a physical quantity detector, a variation deriving portion, a loaded condition detector, and driving output portion. The physical quantity detector detects a physical quantity related to an operating state of the motor. The variation deriving portion derives a variation in the physical quantity based upon the physical quantity detected by the physical quantity detector. The loaded condition detector detects that the motor is under a loaded condition in which the motor is applied with a load based upon the variation derived by the variation deriving portion. The driving output portion generates the driving output corresponding to whether the loaded condition is detected by the loaded condition detector.

18 Claims, 7 Drawing Sheets

(56) References Cited

U.S. PATENT DOCUMENTS

2013/0014967 A1\* 1/2013 Ito .............................. B25F 5/00
  173/93
2013/0062086 A1\* 3/2013 Ito ....................... B25B 23/1475
  173/1

\* cited by examiner

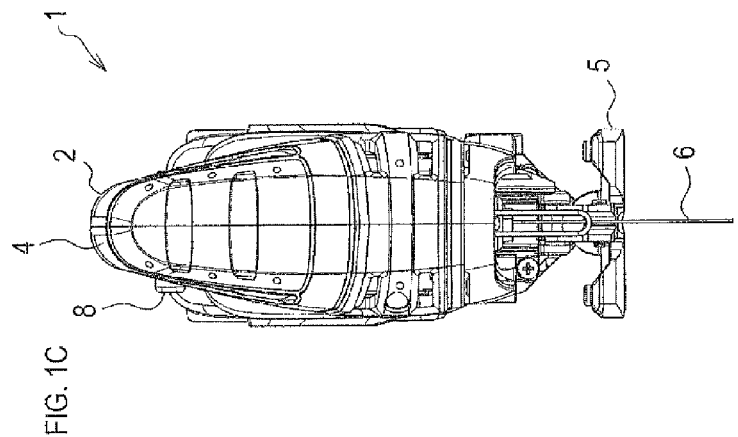
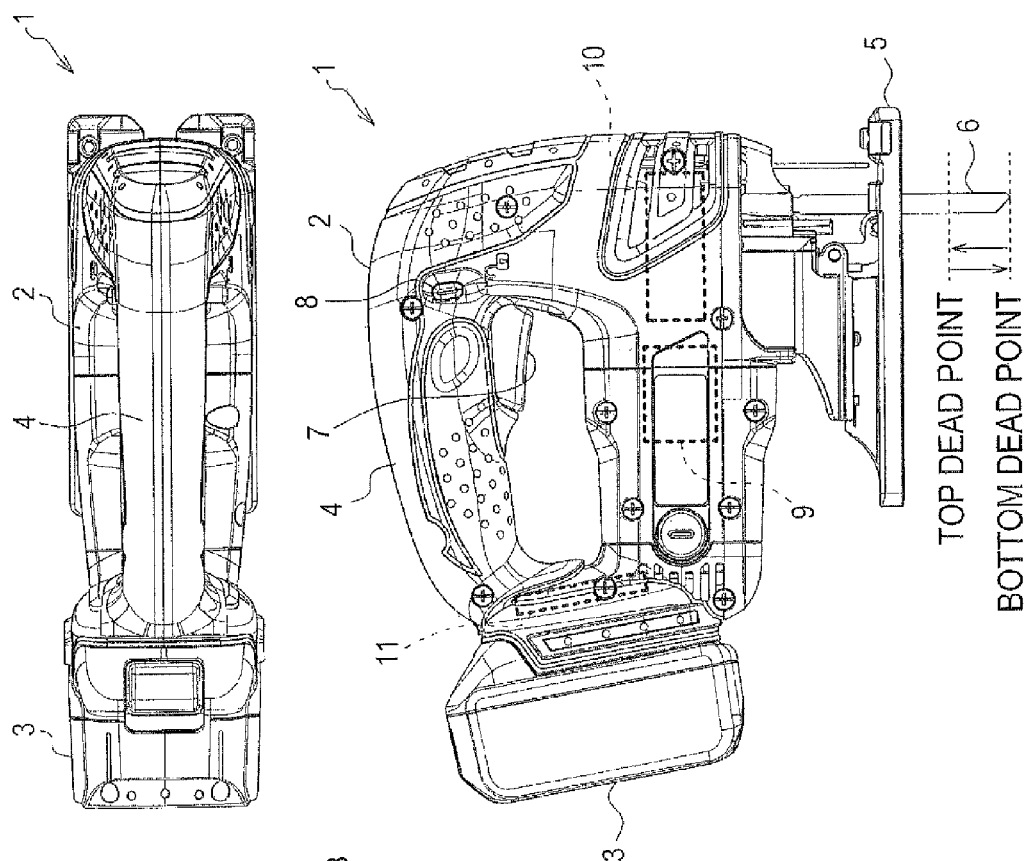

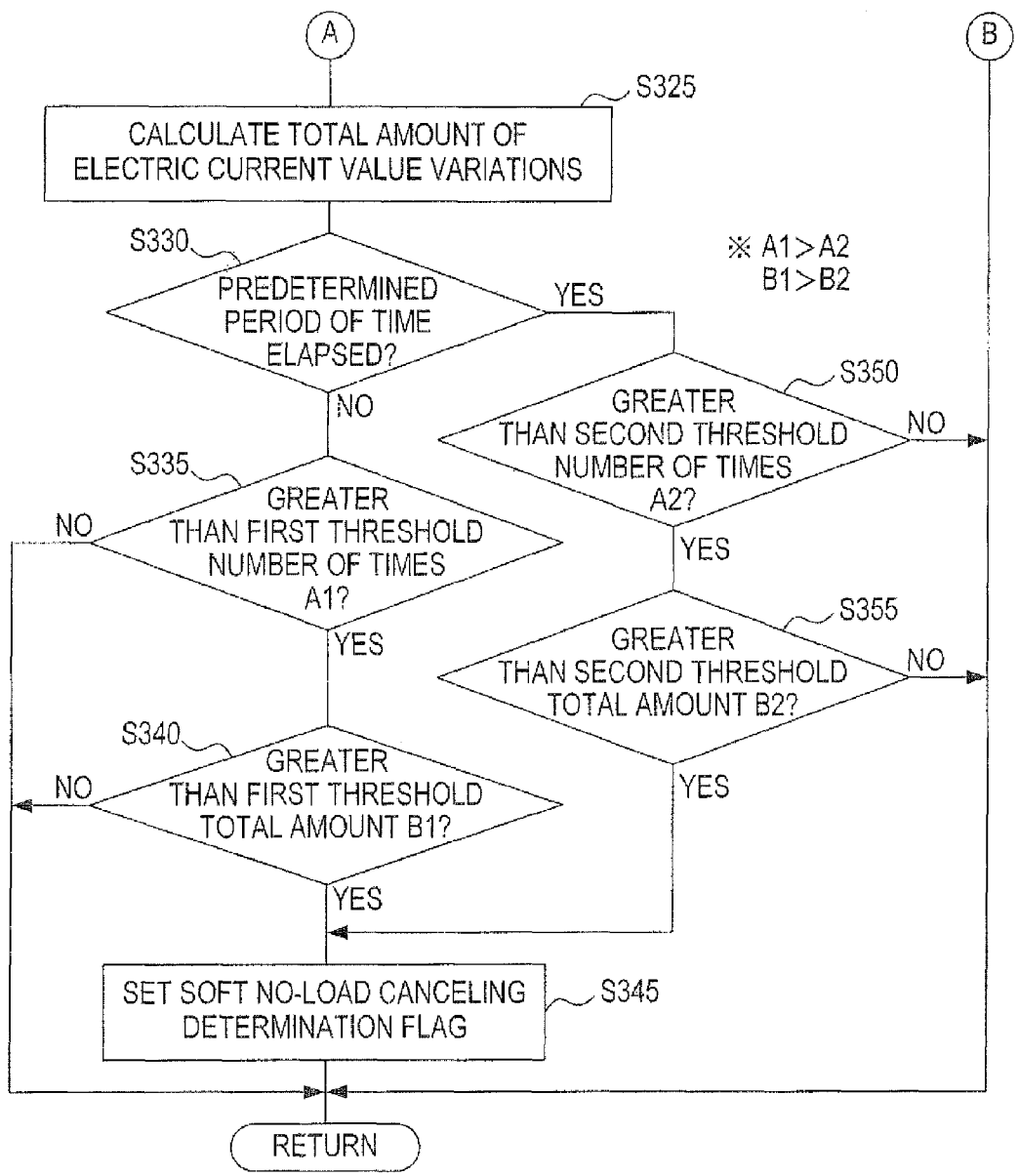

MOTOR-DRIVEN APPLIANCE

CROSS-REFERENCE TO RELATED APPLICATIONS

This application claims the benefit of Japanese Patent Application No. 2013-164267 filed Aug. 7, 2013 in the Japan Patent Office, the disclosure of which is incorporated herein by reference.

BACKGROUND

The present invention relates to a motor-driven appliance.

As various types of motor-driven appliances, such as electric power tools, electric power operating machines, which are driven by motors, a motor-driven appliance having a so-called soft no-load control function is known. In the soft no-load control, a motor output is suppressed during the motor unloaded condition after the start of motor driving, whereas, when the motor is detected to be in the loaded condition, the motor is controlled to increase the motor output.

The motor-driven appliance having such function is configured such that, when the motor is in the unloaded condition, the soft no-load control is executed to rotate the motor at low speed, whereas, when the motor is detected to be in the loaded condition, the soft no-load control is cancelled so as to rotate the motor at high speed.

With a motor-driven appliance exemplarily disclosed in JP60-77694, a threshold value is set for electric current flowing to a motor. This motor-driven appliance is configured such that, when the value of electric current flowing to the motor exceeds the threshold value, the motor condition is determined to have shifted from an unloaded condition to a loaded condition. A soft no-load control is thus cancelled so as to increase the rotational speed of the motor.

SUMMARY

However, even under the same motor loaded condition, variation in the value (absolute value) of the electric current flowing to the motor may occur due to an individual difference among motor-driven appliances, a difference of motor power supply voltages (e.g., battery voltages), and so on. Such variation may cause a difference in sensitivity to detect motor load.

Therefore, as exemplarily described above, according to a motor load detecting method based upon the comparison result between the value of electric current (absolute value) and the threshold value, it may become difficult to detect with high precision that the motor is in the loaded condition. It is possible for example to set the threshold value to be low in order to enhance the sensitivity to detect the motor load. This makes it easier to detect the motor loaded condition; however, this increases a possibility of erroneous detection. In contrast, setting the threshold value to be high reduces the possibility of erroneous detection of the motor loaded condition but increases a possibility of detection omission of the motor loaded condition.

According to one aspect of an embodiment of the present disclosure, it is desirable to precisely detect that a motor of a motor-driven appliance is loaded.

The motor-driven appliance according to one aspect of an embodiment of the present disclosure includes a motor and a controller configured to control a driving output to drive the motor. The controller includes a physical quantity detector, a variation deriving portion, a loaded condition detector, and a driving output portion.

The physical quantity detector detects a physical quantity related to an operating state of the motor. The variation deriving portion derives a variation in the physical quantity based upon the physical quantity detected by the physical quantity detector. The loaded condition detector detects that the motor is under a loaded condition in which the motor is applied with a load, based upon the variation derived by the variation deriving portion. The driving output portion generates the driving output corresponding to whether the loaded condition is detected by the loaded condition detector.

According to the motor-driven appliance configured as described above, the motor loaded condition is detected based upon the variation in the physical quantity related to the operating state of the motor, thereby enabling precise detection of the motor loaded condition. In addition, the motor-driven appliance is configured such that the loaded condition is detected not by use of the physical quantity itself related to the operating state of the motor but by use of the variation in the physical quantity.

The driving output portion may generate a driving output based upon a predetermined unloaded-condition driving method when the loaded condition is not detected by the loaded condition detector and may generate a driving output based upon a predetermined loaded-condition driving method when the loaded condition is detected by the loaded condition detector.

In this case, the motor can be driven appropriately when the loaded condition is not detected and detected respectively, thereby leading to efficient functioning of the motor-driven appliance.

The loaded condition detector may detect that the motor is under the loaded condition at least one of when the variation derived by the variation deriving portion is a positive value indicative of an increase in the physical quantity or when the variation is greater than a predetermined positive threshold value.

When the motor is loaded, an increase in the physical quantity or the large variation may sometimes occur. Therefore, it is possible to easily achieve high precise detection of the loaded condition by detecting the loaded condition based upon the increase in the physical quantity or the large variation.

Various specific structures to detect the loaded condition are considered. For example, the motor-driven appliance may be configured as follows. That is, the physical quantity detector may detect the physical quantity at every predetermined detection time. The variation deriving portion may derive at every predetermined detection time a variation between a previous physical quantity detected by the physical quantity detector at a previous detection time and a current physical quantity detected by the physical quantity detector at a current detection time. Further, the controller may include an increase determination portion and a counter. The increase determination portion determines at every predetermined detection time whether the variation derived by the variation deriving portion is a positive value. The counter counts a frequency of increase that is the number of times that the increase determination portion determines the variation derived by the variation deriving portion is the positive value within a detecting period of time between a detection time a predetermined period of time before a current detection time and the current detection time. The loaded condition detector may detect that the motor is under the loaded condition when the frequency of increase counted by the counter is greater than a predetermined threshold number of times.

As described above, by detecting that the motor is under the loaded condition when the number of times that the variation is the positive value within the detecting period of time is greater than the threshold number of times, it is possible to suppress erroneous detection of the loaded condition and to enhance precision to detect the loaded condition.

For example, the motor-driven appliance may be configured as described below. That is, the controller may include a sum calculator. This sum calculator calculates at every predetermined detection time a sum of the variation derived by the variation deriving portion during a detecting period of time between a detection time a predetermined period of time before a current detection time and the current detection time. The loaded condition detector may detect that the motor is under the loaded condition when the sum calculated by the sum calculator is greater than a predetermined sum threshold value.

As described above, also by detecting that the motor is under the loaded condition when the sum of the variation during the detecting period of time is greater than the sum threshold value, it is possible to inhibit erroneous detection of the loaded condition and to enhance precision to detect the loaded condition.

Further, the motor may be detected to be under the loaded condition when the number of times within the detecting period of time that the variation in the physical quantity is the positive is greater than the threshold number of times and when the sum calculated by the sum calculator is greater than the sum threshold value.

As described above, it is possible to further enhance precision to detect the loaded condition by detecting the loaded condition due to the two conditions being both satisfied.

The controller may further include a threshold number of times setting portion. The threshold number of times setting portion switches the threshold number of times from a value used from the start of the motor driving by the driving output portion until a predetermined time elapses to a value used after the predetermined time has elapsed, wherein these two values are different.

The controller may further include a sum threshold value setting portion. The sum threshold value setting portion switches the sum threshold value from a value used from the start of the motor driving by the driving output generated by the driving output portion until a predetermined time elapses to a value used after the predetermined time has elapsed, wherein these two values are different.

As described above, by switching the threshold number of times or the sum threshold value to a different value in accordance with the time elapsed after the start of the motor driving, it is possible to set a threshold value appropriate to the operating state of the motor and to enhance further precision to detect the loaded condition accordingly.

The physical quantity detector may be configured to detect a current flowing to the motor as the physical quantity. In this case, the variation deriving portion may derive a variation in the current detected by the physical quantity detector as the variation.

The electric current flowing to the motor can be relatively easily detected. The electric current flowing to the motor is reflected relatively well with the motor operating state; and the electric current varies when the motor is loaded and not loaded. Therefore, with reference to a value of the electric current flowing to the motor, it is possible to detect the loaded condition easily and appropriately.

BRIEF DESCRIPTION OF THE DRAWINGS

The present invention will now be described by way of example with reference to the accompanying drawings, in which:

FIGS. 1A-1C are views illustrating an outer appearance of an electric power tool according to an embodiment; FIG. 1A is a plan view thereof, FIG. 1B is a side view thereof, and FIG. 1C is a front view thereof;

FIG. 5B is a flowchart specifically illustrating a remaining of the soft no-load canceling determination process.

DETAILED DESCRIPTION OF THE PREFERRED EMBODIMENTS

Figure 2:
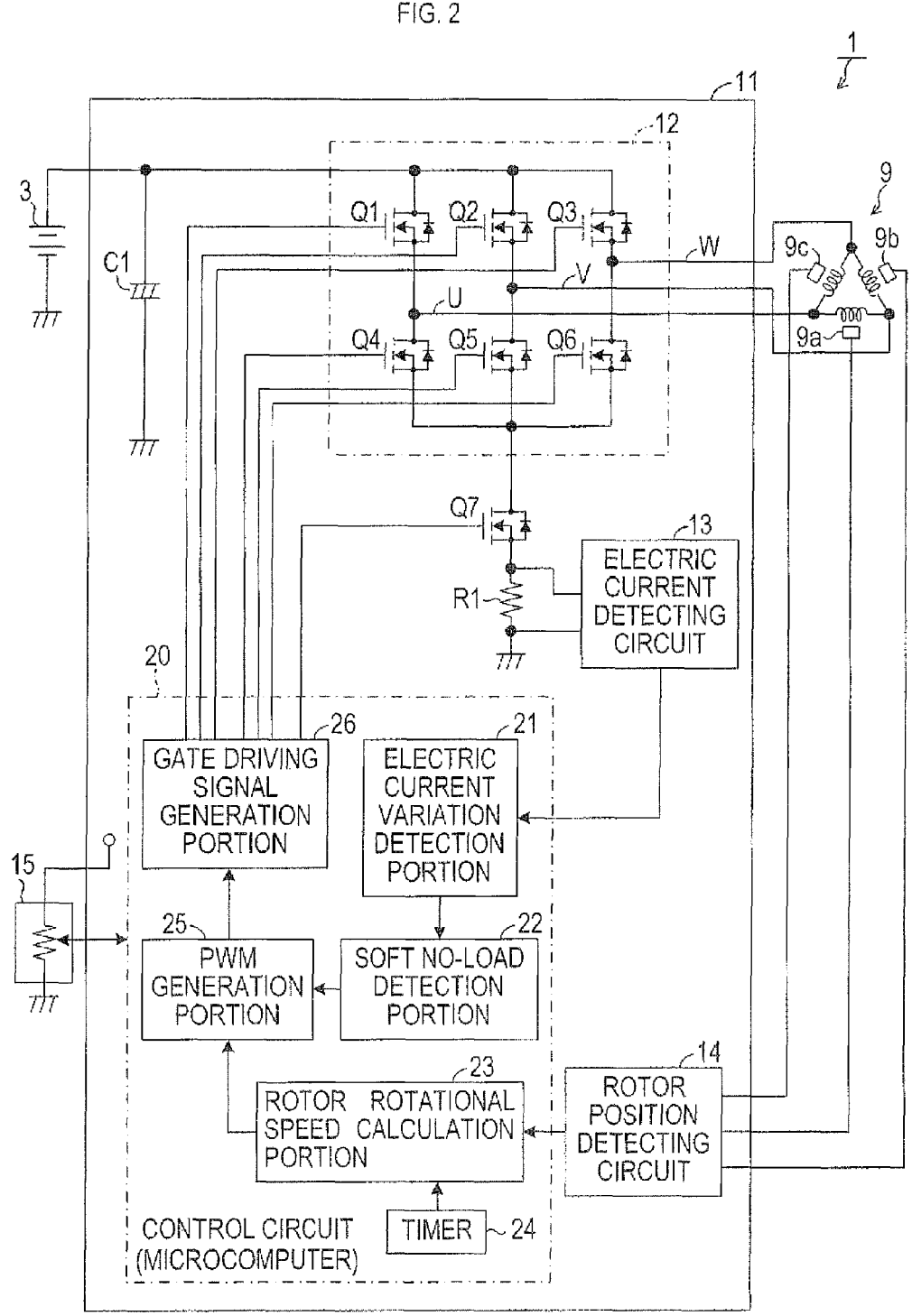
FIG. 2 is a configuration view illustrating an electrical configuration of the electric power tool according to the embodiment.

The present invention is not in any way restricted to the specific devices and structures and so on exemplarily described in an embodiment below, and various modes may be adopted without departing from the scope of the present invention. For example, a part of the structures of the following embodiment may be replaced by a known structure having the same function or may be added, replaced or omitted relative to the structures of the other embodiments. Further, a plurality of embodiments as described below may be arbitrarily combined.

(1) Whole Structure of Electric Power Tool 1

The electric power tool 1 illustrated in FIGS. 1A-1C is a mere example of a motor-driven appliance and is configured as a so-called jigsaw to cut out processed materials such as wood and metal.

The electric power tool 1 includes a tool main body 2 and a battery 3. One end of the tool main body 2 is configured such that the battery 3 is detachable from and attachable to the main body 2. The battery 3 is provided with a rechargeable battery that is repetitively rechargeable. FIGS. 1A-1C illustrate the battery 3 attached to the tool main body 2.

The tool main body 2 includes a grip portion 4, a base 5, a blade 6, a trigger 7, a lock-off button 8, a motor 9, a transmitting mechanism 10, and a motor driving device 11. The motor 9, the transmitting mechanism 10, and the motor driving device 11 are housed inside the housing of the tool main body 2.

The grip portion 4 is a portion for a user to grip by his hand when he uses the electric power tool 1. The base 5 is a plate-shaped member for stabilizing an operation such as cutting processed materials. For example, when cutting a processed material, placing the base 5 on an upper surface of the processed material allows the stable and efficient cutting operation.

The blade 6 is an elongate plate-shaped metal member to cut processed materials and has a cutting blade at an edge of its one end (edge at the right side of FIG. 1B). The blade 6 is reciprocated vertically (an up-and-down direction in FIGS. 1B and 1C) by aid of a rotational force of the motor 9. That is, the blade 6 can reciprocate between a top dead point P1 and a bottom dead point P2 as illustrated in FIG. 1B. While the blade 6 is reciprocating, the cutting blade of the blade 6 is pressed onto the processed material so that the blade 6 cuts the processed material.

The trigger 7 is a switch operated by a user to control the reciprocation of the blade 6. In response to a user's pulling of the trigger 7, a trigger switch 15 (see FIG. 2) is turned on and the motor 9 is driven to operate (reciprocate) the blade 6. The lock-off button 8 is a button to allow or prohibit the pulling operation of the trigger 7. When the lock-off button 8 is set to a lock state, the trigger 7 is prohibited from pulling. When the lock-off button 8 is set to an unlock state, the trigger 7 is allowed to be pulled.

The motor 9 is a three-phase brushless motor and rotates with electric power supplied from the battery 3. A rotational force of the motor 9 is transmitted to the blade 6 via the transmitting mechanism 10. The transmitting mechanism 10 converts a rotational motion of the motor 9 into a straight line motion and then transmits the straight line motion to the blade 6. The driving speed of the blade 6 and the rotational speed of the motor 9 are in an approximately linear relation, in which the higher the rotational speed of the motor 9 is, the higher the driving speed of the blade 6 becomes. The rotational speed of the motor 9 as described herein refers to the number of rotations per unit of time, i.e., an angular speed. The motor driving device 11 controls rotational driving of the motor 9, which leads to controlling reciprocation driving of the blade 6.

(2) Electrical Configuration of Electric Power Tool 1

As seen from FIG. 2, the motor driving device 11 is provided with a power-supply line connected to a positive electrode of the battery 3 and a ground line connected to a negative electrode of the battery 3.

A switching circuit 12 is disposed between the power-supply line at the side of the positive electrode and the ground line at the side of the negative electrode. The switching circuit 12 includes three switching elements (high-side switches) Q1, Q2, and Q3 and three switching elements (low-side switches) Q4, Q5, and Q6 and is adapted to control electric current flowing to phases U, V, and W of the motor 9. The switching elements Q1, Q2, and Q3 are disposed in a positive electrode-side conducting path between the power-supply line and terminals for the respective corresponding phases U, V, and W of the motor 9, and the switching elements Q4, Q5, and Q6 are disposed in a negative electrode-side conducting path between the ground line and terminals for the respective corresponding phase U, V, and W of the motor 9.

A switching element (current cutoff switch) Q7 to interrupt power supply and a resistor R1 are disposed in the negative electrode-side conducting path between the switching circuit 12 and the ground line (i.e., between the negative electrode-side switching elements Q4, Q5, and Q6 and the ground line).

An electric current detecting circuit 13 is connected to both ends of the resistor R1, which detects electric current supplied to the motor 9 based upon a voltage across both ends of the resistor R1. A detected signal from the electric current detecting circuit 13 is inputted to a control circuit 20.

A smoothing capacitor C1 is disposed between the ground line and the power-supply line (positive electrode-side conducting path) extending from the positive electrode of the battery 3 to the switching circuit 12. The motor driving device 11 also includes a rotor position detecting circuit 14 to detect a rotational position of the motor 9 (a position of the rotor in a rotational direction). A detected signal from the rotor position detecting circuit 14 is also inputted to the control circuit 20.

The rotor position detecting circuit 14 detects a rotational position (in other words, rotation angle) of the motor 9 based upon detected signals (Hall signals) from three Hall sensors 9*a*, 9*b*, and 9*c* that are included in the motor 9 to detect rotational positions.

Specifically, the Hall sensors 9*a*, 9*b*, and 9*c* are arranged around the rotor of the motor 9 at a 120-degree interval and outputs Hall signals of U, V, and W phases, of which increase/decrease directions inverts every time the rotor rotates at 180 degrees.

The rotor position detecting circuit 14 shapes waveforms of the Hall signals of U, V, and W phases from the corresponding Hall sensors 9*a*, 9*b*, and 9*c*, generates pulse-like Hall signals inverting positive and negative every 180-degree rotation of the rotor, and detects a rotational position of the motor 9 (specifically, rotor) at a 60-degree interval with reference to an edge of each Hall signal.

The control circuit 20 executes driving control of the motor 9 in accordance with a state of the trigger switch 15 changed in response to a user's operation of the trigger 7. The control circuit 20 of the embodiment is configured with a microcomputer having at least a CPU, ROM, and RAM.

The trigger switch 15 has a switch portion, which detects a presence or absence of a pulling operation of the trigger 7 and outputs a detected signal to the control circuit 20, and an operation amount output portion which outputs to the control circuit 20 an analog operation amount signal in response to a pulling operation amount of the trigger 7.

When a user pulls the trigger 7, the switch portion inside the trigger switch 15 outputs to the control circuit 20 a detected signal indicating the presence of the pulling operation of the trigger 7. Upon receiving the detected signal, the control circuit 20 determines an input of a motor driving command and drives the motor 9. When the pulling operation of the trigger 7 is released and no detected signal is inputted to the control circuit 20, the control circuit 20 brakes the motor 9.

The method for the control circuit 20 to perform driving control of the motor 9 while the trigger 7 is being pulled varies depending on the pulling amount of the trigger 7, a state of load applied to the motor 9, and whether a function of soft no-load control (details described below) is set valid.

In order to perform such driving control of the motor 9, the control circuit 20 executes various control programs stored in the ROM and provides functions as an electric current variation detection portion 21, a soft no-load detection portion 22, a rotor rotational speed calculation portion 23, a timer 24, a PWM (Pulse Width Modulation) generation portion 25, and a gate driving signal generation portion 26, which all are illustrated in FIG. 2.

The electric current variation detection portion 21 detects a value of electric current flowing to the motor 9 based upon the detected signal from the electric current detecting circuit 13 at every information obtaining time being a predetermined information obtaining cycle (synchronized with a control cycle described below in the embodiment). The electric current variation detection portion 21 detects i) a variation of a value of electric current detected this time from a value of electric current detected at the previous information obtaining time and ii) whether the variation is positive (increasing) or negative (decreasing). The function of the electric current variation detection portion 21 is achieved by a process in S100 of FIG. 4 as described below.

According to the embodiment, the electric current variation detection portion 21 converts a variation in a value of electric current into a discrete value for detection. Specifically, based upon a reference value Io for a certain amount of electric current, when an increase in electric current is equal to or greater than the reference value Io, the electric current variation detection portion 21 determines that a variation in a value of electric current is "+1". When an increase in electric current is twice as large as the reference value Io or more, the electric current variation detection portion 21 determines that a variation in a value of electric current is "+2". In contrast, when electric current is decreasing and a decrease in electric current is equal to or greater than the reference value Io, the electric current variation detection portion 21 determines that the a variation in a value of electric current is "−1". When the decrease in electric current is twice as large as the reference value Io or more, the electric current variation detection portion 21 determines that a variation in a value of electric current is "−2".

A method of converting a variation in a value of electric current to a discrete value is not limited to the above. For example, when an increase in electric current is n (natural number) times as large as the reference value Io or more, a variation in a value of electric current is set to "+n". When a decrease in electric current is n (natural number) times as large as the reference value Io or more, a variation in a value of electric current is set to "−n". As described now, an absolute value of a variation in a value of electric current (discrete value) may be set to be larger as an increase (or decrease) in electric current becomes larger. Further, it is not limited to a method of calculating a variation in a value of electric current based upon the reference value Io, and a variation in a value of electric current (discrete value) may be calculated by other predetermined methods according to a variation in a value of electric current.

Still further, converting a variation in a value of electric current to a discrete value is also not essential. Various methods can be adopted, by which a variation in a value of electric current is calculated based upon change in electric current.

The soft no-load detection portion 22 determines whether the motor 9 is in an unloaded condition or a loaded condition and generates a command indicating execution or canceling of a soft no-load control based upon the determination results (specifically, sets or clears a soft no-load canceling determination flag as described below). The soft no-load control will be described in detail below. The function of the soft no-load detection portion 22 is achieved by a process in S300 of FIG. 4 as described below.

The rotor rotational speed calculation portion 23 calculates a rotational speed of the motor 9 (specifically, rotational speed of the rotor of the motor 9) based upon a rotational position of the motor 9 detected by the rotor position detecting circuit 14 and information on time counted by the timer 24. The function of the rotor rotational speed calculation portion 23 is achieved by a process in S100 of FIG. 4 as described below. The timer 24 is a known clocking device. The timer 24 can be arbitrarily designed to be configured with either hardware or software.

The PWM generation portion 25 calculates a driving duty ratio (hereinafter referred to as "PWM duty") to PWM control electric current supplied to the motor 9, generates a PWM command indicating the PWM duty, and outputs the PWM command to the gate driving signal generation portion 26. Specifically, the PWM generation portion 25 calculates a PWM duty based upon various information, such as a rotational speed calculated by the rotor rotational speed calculation portion 23, a pulling amount of the trigger 7, a command from the soft no-load detection portion 22, and so on. The function of the PWM generation portion 25 is achieved by processes in S200 and S400 of FIG. 4 as described below. A method of calculating a PWM duty will be described in detail below.

The gate driving signal generation portion 26 drives each switching element Q1 to Q6 of the switching circuit 12 in accordance with the PWM command from the PWM generation portion 25. As a result, electric current corresponding to the PWM duty is supplied to each phase U, V, and W of the motor 9, and the motor 9 rotates at a rotational speed corresponding to the PWM duty. The function of the gate driving signal generation portion 26 is achieved by a process in S500 of FIG. 4 as described below.

(3) Description of Soft No-Load Control Function

The soft no-load control function will be described below. The electric power tool 1 of the embodiment has a soft no-load control function as a function to control the motor 9. The soft no-load control function is in general a control method of determining whether the motor 9 is in the unloaded condition or loaded condition, rotating the motor 9 at a low rotational speed when the motor 9 is in the unloaded condition (i.e., executing the soft no-load control) and rotating the motor 9 at a high rotational speed when the motor 9 is in the loaded condition (i.e., canceling the soft no-load control).

According to the embodiment, the "unloaded condition" as described herein refers to a condition in which the motor 9 has been applied with no load, i.e., the blade 6 is idling with no contact with a processed material. The "loaded condition" as described herein refers to a condition in which the motor 9 has been applied with a load, i.e., the blade 6 is in contact with other objects such as a processed material.

According to the embodiment, when the motor 9 is started, the soft no-load control is executed assuming that the motor 9 is in the unloaded condition. That is, regardless the pulling amount of the trigger 7, the motor 9 is rotationally driven at a predetermined low rotational speed (e.g., predetermined low rotational speed corresponding to the PWM duty 50%) being a target rotational speed. Accordingly, even if the trigger 7 is pulled largely while the soft no-load control is being executed (the motor loaded condition not detected), the rotational speed of the motor 9 is limited to the predetermined low rotational speed.

According to the embodiment, when the motor 9 is rotationally driven at the low rotational speed under the unloaded condition, i.e., when the soft no-load control is executed, the motor 9 is not subjected to an open control by use of a constant PWM duty (e.g., 50% fixed) but is subjected to a fixed rotational speed control (feedback control) by use of a PWM duty corrected so as to make an actual motor rotational speed correspond to the predetermined low rotational speed.

According to the embodiment, however, when the pulling amount of the trigger 7 is less than a predetermined pulling amount (e.g., the actual pulling amount smaller than a predetermined percentage of the maximum possible pulling amount), it is configured not to execute the soft no-load control. Accordingly, even if the motor 9 is in the unloaded condition, when the pulling amount of the trigger 7 is less than the predetermined pulling amount, the motor 9 is driven by a PWM duty corresponding to the pulling amount of the trigger 7.

When the motor loaded condition is detected after the startup of the motor 9, the soft no-load control is cancelled. Specifically, according to the embodiment, the motor 9 is driven by the PWM duty corresponding to the pulling amount of the trigger 7. Accordingly, the rotational speed of the motor 9 increases as the pulling amount of the trigger 7 becomes larger.

Various approaches of driving the motor 9 under the loaded condition (i.e., when the soft no-load control is invalidated) are considered. For example, the motor 9 may be driven at a predetermined rotational speed (e.g., PWM duty 100%) higher than the above-described predetermined low rotational speed employed during the soft no-load control being executed. Further, it can be arbitrarily determined whether the driving control of the motor 9 may be performed by the open control or the fixed rotational speed control (feedback control).

(4) Load Condition Detecting Method

Described below is a loaded condition detecting method, i.e., how to detect whether the motor 9 is shifted to the loaded condition after the startup of the motor 9.

When the motor 9 is shifted from the unloaded condition to the loaded condition, a value of electric current flowing to the motor 9 in general increases from a value of electric current under the unloaded condition. According to the embodiment, a condition of the motor 9 (loaded or unloaded) is detected based upon an increase in a value of electric current flowing to the motor 9. Specifically, the motor 9 is determined to be under the loaded condition when the two conditions 1 and 2 as follows are both satisfied for a detecting period of time. Here, the detecting period of time is the period of time between a current information obtaining time and an information obtaining time a predetermined period of time before the current information obtaining time. The predetermined period of time is, for example, a span ten times as long as an information obtaining cycle.

Condition 1: detect a variation (variation quantity) in a value of electric current periodically (at every information obtaining time), and the number of times of detecting that the variation in a value of electric current is positive (increasing) during the predetermined detecting period of time exceeds a predetermined threshold number of times A (e.g., four times).

Condition 2: detect a variation (variation quantity) in a value of electric current periodically (at every information obtaining time), and the total amount of the variation in a value of electric current during the predetermined detecting period of time exceeds a predetermined threshold total amount B (e.g., +4).

Both of Conditions 1 and 2 do not necessarily have to be satisfied to determine that the motor 9 is in the loaded condition; and the motor 9 may be determined to have shifted to the loaded condition when either Condition 1 or 2 is satisfied. That is, with or without satisfaction of Condition 2, when Condition 1 is satisfied, the motor 9 may be determined to have shifted to the loaded condition.

However, in fact, a variation in a value of electric current of the motor 9 often occurs, and an AD converter (not illustrated) in the control circuit 20 with higher precision may detect even small variation as a variation in a value of electric current of the motor 9. Accordingly, even when a small variation in a value of electric current occurs when the motor 9 is under the unloaded condition, the small variation in a value of electric current is detected. As a result, despite the motor 9 still remaining under the unloaded condition, the number of times to detect that a variation in a value of electric current is positive exceeds the predetermined threshold number of times A, which leads to an erroneous detection that the motor 9 is under the loaded condition. Therefore, according to the embodiment, it is configured to detect whether the motor 9 is under the loaded condition, in consideration of not only Condition 1 but also Condition 2.

In contrast, with or without satisfaction of Condition 1, when Condition 2 is satisfied, the motor 9 may be determined to have shifted to the loaded condition.

However, a value of electric current widely varies depending on a load applied to the motor 9 such as instant impact (e.g., only a momentary contact of the blade 6 against the other object), which may lead to the total amount of variations in values of electric current exceeding the predetermined threshold total amount B in a very short time. As a specific example, a situation may be assumed where the blade 6 erroneously comes in contact with some other objects without the intention of an operator who does not mean to cut the processed material, and the operator rushes to take the blade 6 away from the object. In such situation, although the operator does not intend to cut the processed material, if a variation in a value of electric current exceeds the predetermined threshold total amount B in a very short time, the motor 9 is erroneously determined to be under the loaded condition and the rotational speed of the motor 9 increases. Therefore, according to the embodiment, it is configured to determine whether the motor 9 is under the loaded condition, in consideration of not only Condition 2 but also Condition 1.

According to the embodiment, each of the above-mentioned thresholds (the predetermined threshold number of times A and the predetermined threshold total amount B) is configured to be shifted among two types of thresholds according to an elapsed time from the startup of the motor 9. Specifically, until a predetermined period of time elapses from the startup of the motor 9, it is configured that the predetermined threshold number of times A is a first threshold number of times A1 and the predetermined threshold total amount B is a first threshold total amount B1. Once the predetermined period of time elapses from the startup of the motor 9, it is configured that the predetermined threshold number of times A is a second threshold number of times A2 being smaller than the first threshold number of times A1 and the predetermined threshold total amount B is a second threshold total amount B2 being smaller than the first threshold total amount B1.

As described above, each of the threshold values A and B are designed to be relatively large until the predetermined period of time elapses from the startup of the motor 9 and to be relatively small after the predetermined period of time elapses from the startup of the motor 9. This is especially for the purpose of inhibiting the possibility that the motor 9 is erroneously determined to be under the loaded condition when the motor 9 is unstable immediately after the startup of the motor 9. Accordingly, by setting each of the threshold values A and B at large values for a while after the startup of the motor 9, it is possible to inhibit that the motor 9 is erroneously determined to be under the loaded condition when the motor 9 is unstable immediately after the startup of the motor 9.

Figure 3:
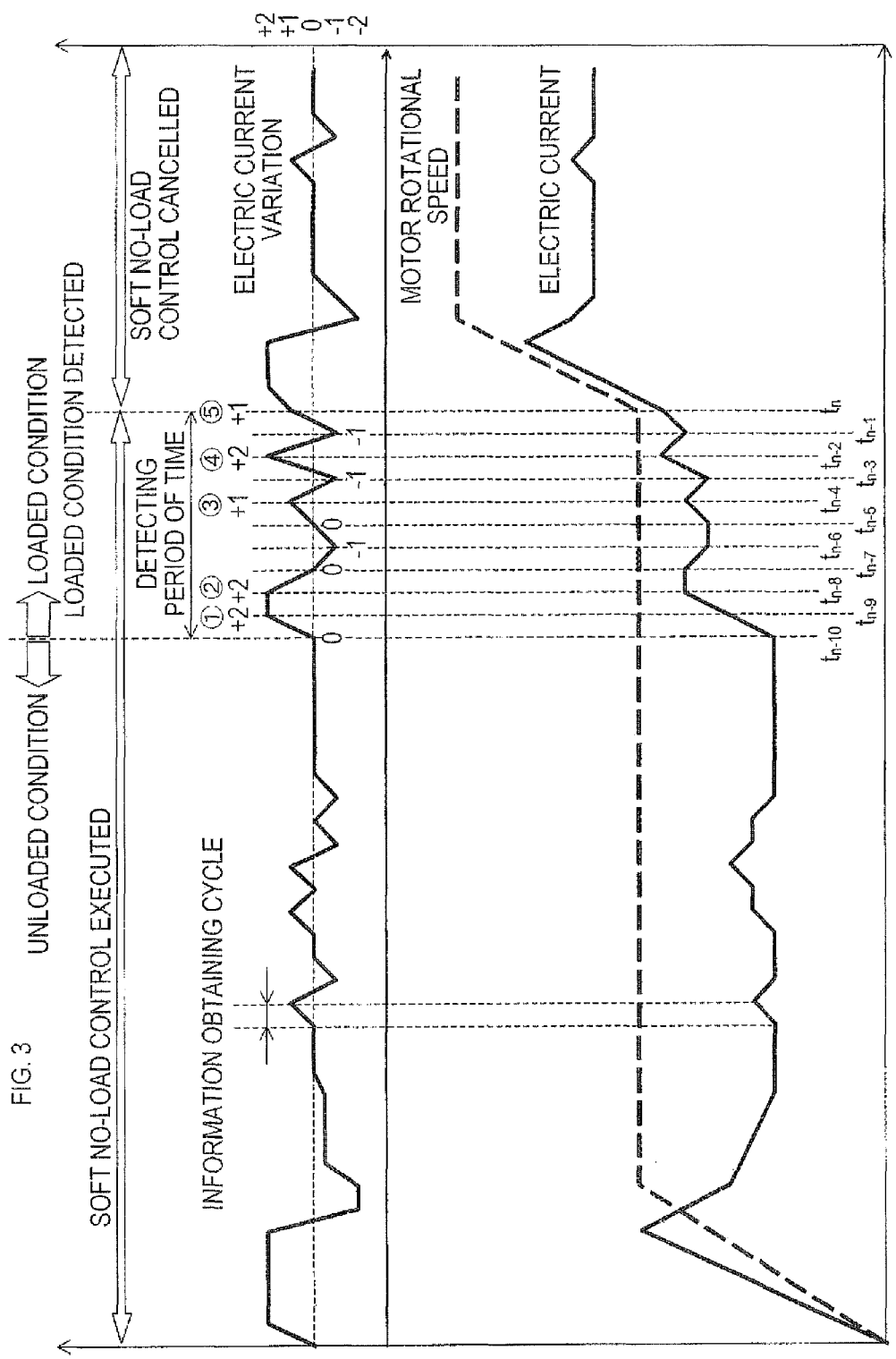
FIG. 3 is an explanatory view exemplarily illustrating changes in a value of electric current, a rotational speed, and a variation in the electric current in a switching process between an unloaded condition and a loaded condition.

FIG. 3 exemplarily illustrates a specific operation of the motor 9 shifting from the unloaded condition to the loaded condition after the startup of the motor 9. FIG. 3 specifically illustrates changes in a value of electric current, rotational speed, and a variation in a value of electric current, of the motor 9 when the motor 9 is shifted from the unloaded condition to the loaded condition after being maintained under the unloaded condition for a while since the startup of the motor 9.

While the motor 9 is under the unloaded condition, the soft no-load control is executed in which the rotational speed of the motor 9 is controlled to the fixed low rotational speed regardless of the pulling amount of the trigger 7. However, as already described above, the soft no-load control is executed when the pulling amount of the trigger 7 is the predetermined pulling amount or more. When the motor loaded condition is detected, the soft no-load control is cancelled and the motor 9 is driven at a rotational speed corresponding to the pulling amount of the trigger 7.

FIG. 3 demonstrates that the motor 9 is shifted from the unloaded condition to the loaded condition at a time $t_{n-10}$. In order to simplify the description with reference to FIG. 3, it is assumed that the predetermined threshold number of times A is four (times) and the predetermined threshold total amount B is +4.

After the startup of the motor 9, at every information obtaining time, a value of electric current is detected and a variation in a value of electric current from a value of electric current detected at the previous information obtaining time is calculated. For example, a value of electric current at the time $t_{n-10}$ is the same as the previous one, and a variation in a value of electric current is zero. A value of electric current at a time $t_{n-9}$ has increased from the previous one (time $t_{n-10}$), and a variation in a value of electric current is +2.

At every information obtaining time, the control circuit 20 calculates the number of times to detect that a variation in a value of electric current is positive (increasing) and the total amount of variations in values of electric current for the detecting period of time between the current information obtaining time and the information obtaining time the predetermined period of time before the current information obtaining time. The control circuit 20 then determines whether the number of times that a variation in a value of electric current is positive is greater than the predetermined threshold number of times A (i.e., whether Condition 1 is satisfied) and whether the total amount of variations in values of electric current is greater than the predetermined threshold total amount B (i.e., whether Condition 2 is satisfied).

FIG. 3 exemplarily demonstrates that the motor 9 is shifted to the loaded condition around the time $t_{n-10}$ and a value of electric current starts increasing. At a time $t_{n-10}$, where the predetermined detecting period of time has elapsed from the time $t_{n-10}$, the number of times that the a variation in a value of electric current is positive (increasing) is five times (time $t_{n-9}$, $t_{n-8}$, $t_{n-4}$, $t_{n-2}$, $t_n$) and the total amount of variations in values of electric current is +5 (=0+2+2+0−1+0+1−1+2−1+1) during the predetermined detecting period of time (between time $t_{n-10}$ and time $t_n$). Conditions 1 and 2 are both then satisfied. Accordingly, the motor 9 is determined to be in the loaded condition at the time $t_n$ and the soft no-load control is canceled at the time $t_n$.

(5) Description of Main Process

Described below is the main process executed by the control circuit 20 of the electric power tool 1 with reference to FIGS. 4, 5, and 6. In the control circuit 20, the CPU reads out a program for the main process in FIG. 4 stored in the ROM and implements the program when the CPU starts operating. The CPU repetitively executes the main process in FIG. 4 at the predetermined control cycle (same as the information obtaining cycle in the embodiment).

Figure 4:
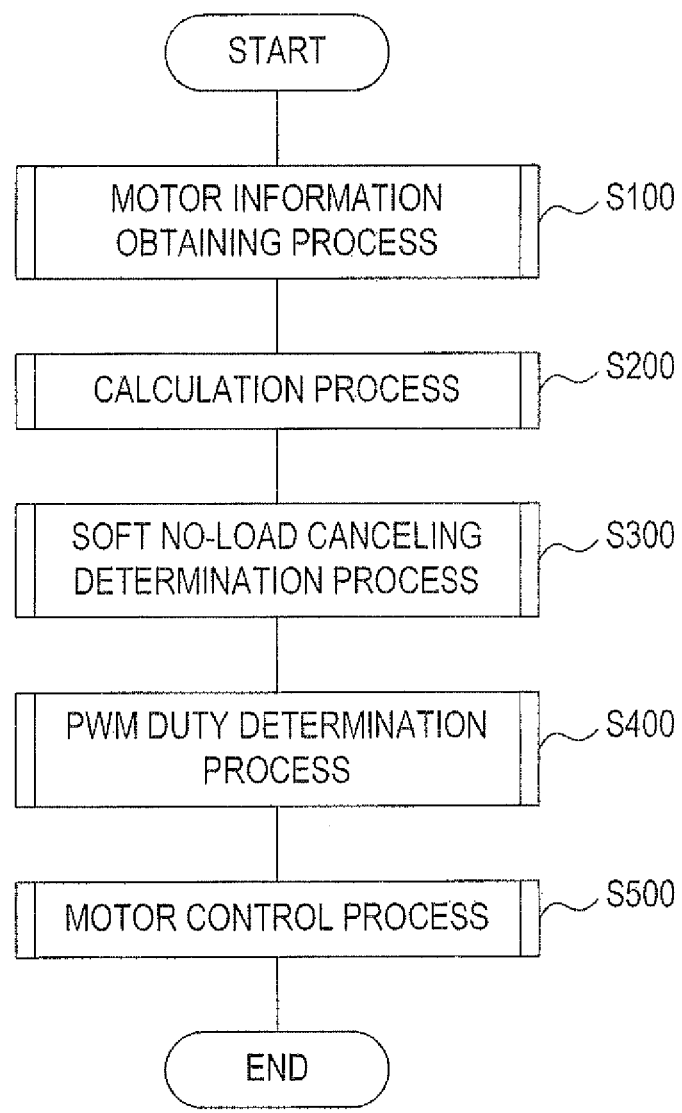
FIG. 4 is a flowchart illustrating a main process.

Once the CPU of the control circuit 20 starts the main process in FIG. 4, the CPU executes a motor information obtaining process in S100. Specifically, the CPU obtains the pulling amount of the trigger 7, the rotational speed of the motor 9, a variation in a value of electric current flowing to the motor 9 (specifically, whether the variation in a value of electric current is positive or negative and a variation in a value of electric current (discrete value) based upon the reference value Io), and so on.

Although it is omitted in FIG. 4, a predetermined initial process is executed prior to the process in S100 after the startup of the main process. In the initial process, a soft no-load canceling determination flag (described below) is cleared. That is, under the initial condition, the motor 9 is considered to be in the unloaded condition, so that the soft no-load control is executed.

In S200, the CPU executes a calculation process of a PWM duty correction amount that is referred to when the motor 9 is subjected to the fixed rotational speed control (feedback control). That is, the CPU calculates a correction amount indicating how much the PWM duty should be corrected from a reference value (e.g., 50%) when the motor 9 is subjected to the feedback control. As already described above, according to the embodiment, during the soft no-load control being executed, a given rotational speed corresponding to a PWM duty 50% is set as the target rotational speed, and the motor 9 is subjected to the feedback control in a manner that the actual rotational speed of the motor 9 matches the target rotational speed. In S200, the correction amount relative to the reference value (50%) of the PWM duty for the feedback control is calculated. The correction amount calculated in S200 is referred to in S425 of FIG. 6 as described below.

Figure 5A:
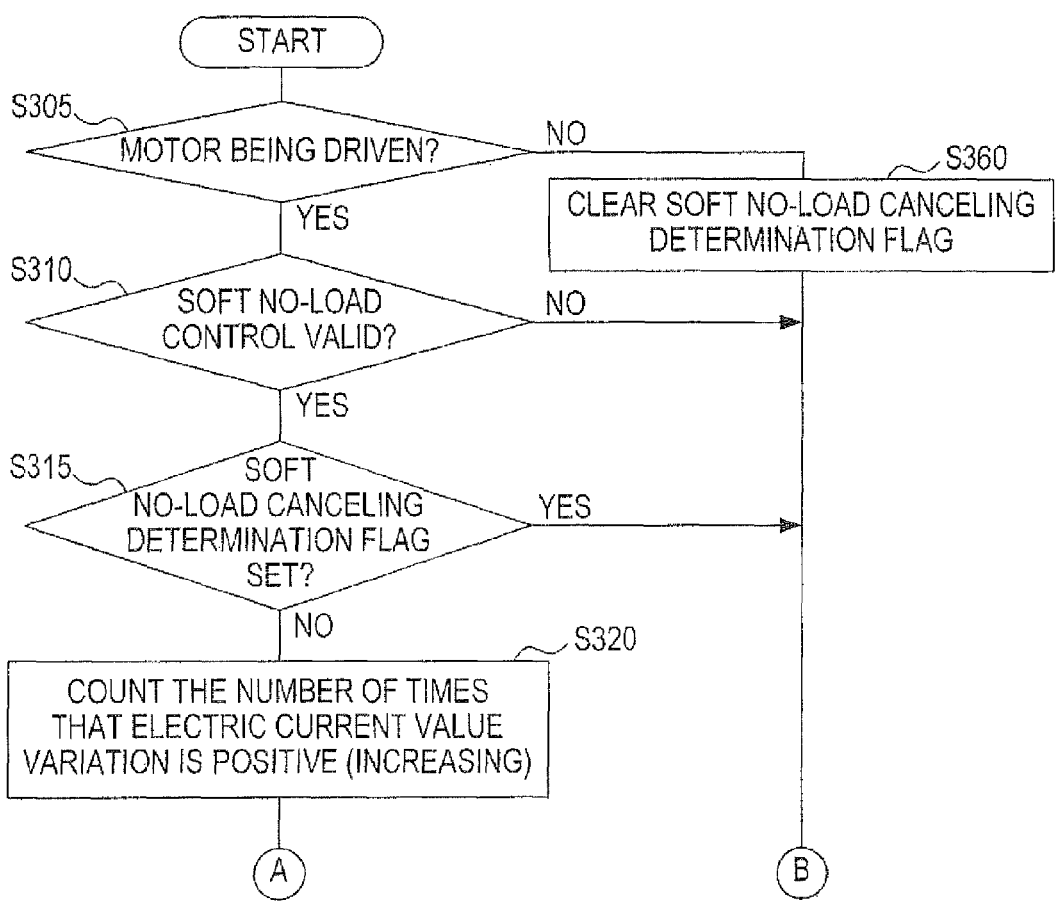
FIG. 5A is a flowchart specifically illustrating a part of a soft no-load canceling determination process of the main process.
Figure 6:
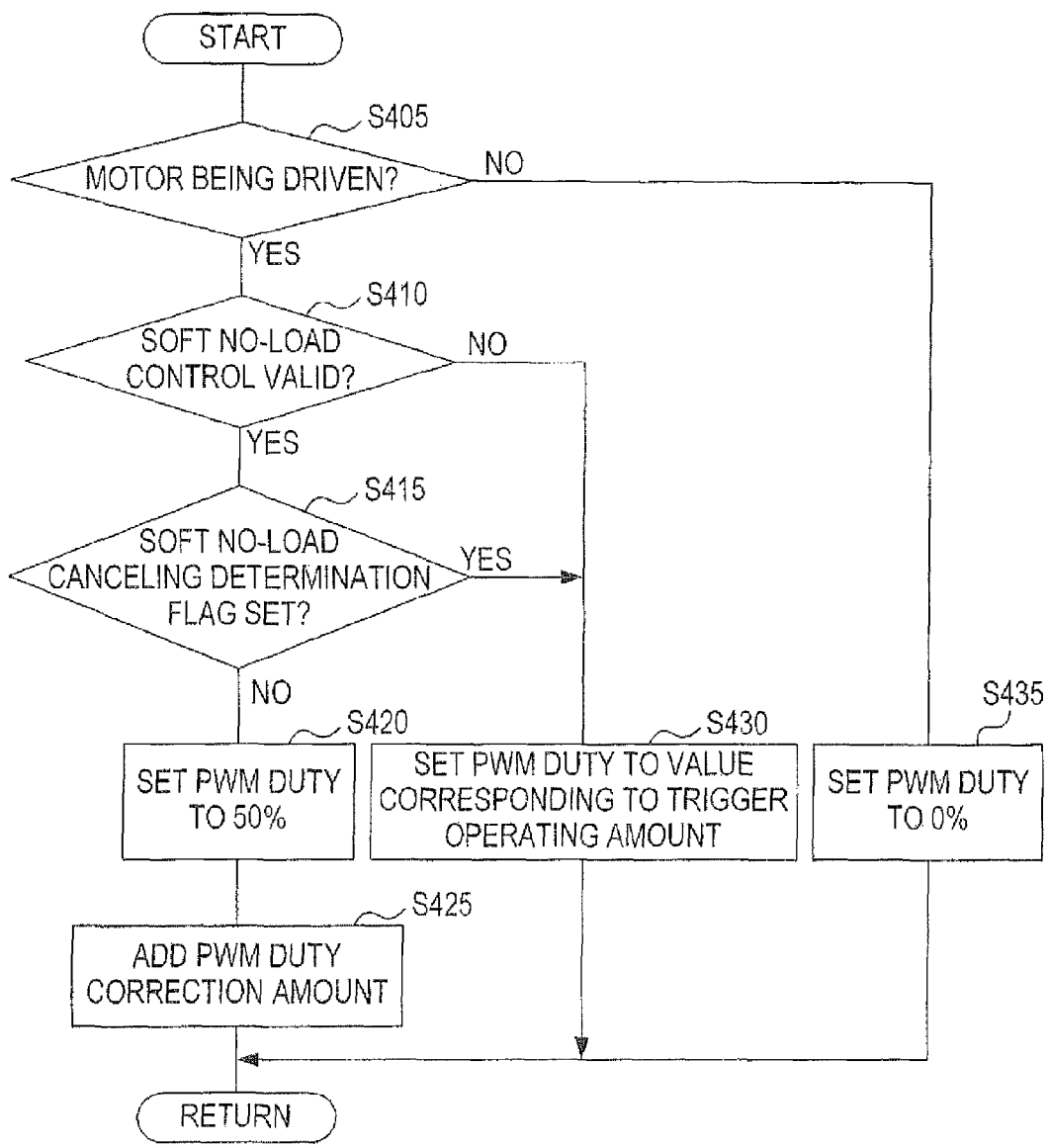
FIG. 6 is a flowchart specifically illustrating a PWM duty determination process of the main process.

In S300, the CPU executes a soft no-load canceling determination process, which is described in detail in FIGS. 5A and 5B. Once the process proceeds to the soft no-load canceling determination process in FIGS. 5A and 5B, the CPU of the control circuit 20 determines in S305 whether the motor 9 is being driven. Whether the motor 9 is being driven can be determined with reference to satisfaction or non-satisfaction of predetermined conditions based upon various states concerning the electric power tool 1, such as a user's operating state of the trigger 7.

When the motor 9 is stopped, the CPU clears in S360 the soft no-load canceling determination flag, and the process proceeds to S400 (see FIG. 4). When the motor 9 is being driven, the CPU determines in S310 whether the soft no-load control is valid. Specifically, the CPU determines in S310 whether the pulling amount of the trigger 7 is the predetermined pulling amount or more.

When the pulling amount is the predetermined pulling amount or more, the CPU determines the soft no-load control to be valid, and the process proceeds to S315. In this case, the soft no-load control is executable. In contrast, when the pulling amount is less than the predetermined pulling amount, the CPU determines that the soft no-load control to be invalid, and the process proceeds to S400 (see FIG. 4). In this case, the soft no-load control is not executed, and the motor 9 is driven by a PWM duty corresponding to a pulling amount of the trigger 7 as described below.

In S315, the CPU determines whether the soft no-load canceling determination flag is set, i.e., whether the motor 9 is detected to be under the loaded condition. When the soft no-load canceling determination flag is already set, i.e., when the motor 9 is already detected to be under the loaded condition, the process proceeds to S400 (see FIG. 4). When the soft no-load canceling determination flag is not yet set, i.e., when the motor 9 is not yet detected to be under the loaded condition, the process proceeds to S320.

In S320, the CPU counts the number of times to detect that a variation in a value of electric current obtained at every information obtaining time during the predetermined detecting period of time is positive (increasing). The predetermined detecting period of time is defined between the current timing and the time point the predetermined period of time before the current timing.

In S325, the CPU calculates a total amount of variations of values of the electric current (discrete values based upon the reference value Io) obtained at every information obtaining time during the same predetermined detecting period of time. In S330, the CPU determines whether the predetermined period of time has elapsed from the startup of the motor 9. When the predetermined period time has not elapsed from the startup of the motor 9, the CPU determines in S335 whether the number of times to detect that a variation in a value of electric current is positive (counted value in S320) is greater than the first threshold number of times A1.

When the number of times that the variation in a value of electric current is positive is equal to or smaller than the first threshold number of times A1, the process proceeds to S400 (see FIG. 4). When the number of times that the variation in a value of electric current is positive is greater than the first threshold number of times A1, the CPU determines in S340 whether the total amount of the variations in values of electric current (counted value in S325) is greater than the first threshold total amount B1.

When the total amount of the variations in values of electric current is equal to or smaller than the first threshold total amount B1, the process proceeds to S400 (see FIG. 4). When the total amount of the variations in values of electric current is greater than the first threshold total amount B1, Conditions 1 and 2 as described above are satisfied. In S345, the CPU sets the soft no-load canceling determination flag. That is, at this point, the motor 9 is detected to be under the loaded condition. The process subsequently proceeds to S400 (see FIG. 4) after executing the process in S345.

When the CPU determines in S330 that the predetermined period of time has elapsed from the startup of the motor 9, the CPU determines in S350 whether the number of times to detect that a variation in a value of electric current is positive (counted value in S320) is greater than the second threshold number of times A2.

When the number of times that the variation in a value of electric current is positive is equal to or smaller than the second threshold number of times A2, the process proceeds to S400 (see FIG. 4). When the number of times that the variation in a value of electric current is positive is greater than the second threshold number of times A2, the CPU determines in S355 whether the total amount of the variations in values of electric current (counted value in S325) is greater than the second threshold total amount B2.

When the total amount of the variations in values of electric current is equal to or smaller than the second threshold total amount B2, the process proceeds to S400 (see FIG. 4). When the total amount of the variations in values of electric current is greater than the second threshold total amount B2, Conditions 1 and 2 as described above are satisfied, the CPU sets in S345 the soft no-load canceling determination flag.

Returning to FIG. 4, the main process proceeds to S400 after the soft no-load canceling determination process in S300. In S400, the CPU executes the PWM duty determination process that is described in detail in FIG. 6. Once the main process proceeds to the PWM duty determination process in FIG. 6, the CPU of the control circuit 20 determines in S405 whether the motor 9 is being driven. This determination in S405 is the same as the one in S305 of FIG. 5A.

When the motor 9 is not being driven, the CPU sets in S435 a PWM duty to 0%. When the motor 9 is being driven, the CPU determines in S410 whether the soft no-load control is valid. This determination in S410 is the same as the one in S310 of FIG. 5A. When the soft no-load control is invalid, i.e., when the pulling amount of the trigger 7 is smaller than the predetermined pulling amount, the CPU sets in S430 the PWM duty to a value corresponding to an operating amount (pulling amount) of the trigger 7.

When the soft no-load control is valid, the CPU determines in S415 whether the soft no-load canceling determination flag is set. When the soft no-load canceling determination flag is set, i.e., when the motor 9 is detected to be under the loaded condition, the CPU sets in S430 the PWM duty to a value corresponding to an operating amount (pulling amount) of the trigger 7. Alternatively, the PWM duty may be set to a fixed value (e.g., 100%, greater than a set value in S420) independently of the operating amount of the trigger 7 after detecting the motor 9 being under the loaded condition.

When the soft no-load canceling determination flag is not set, i.e., when the motor 9 is not yet detected to be under the loaded condition, the CPU sets in S420 the PWM duty to a predetermined 50%. In S425, the CPU adds the PWM duty correction value (correction value calculated in S200) for the fixed rotational speed control (feedback control) into the reference value (50%) of the PWM duty.

Returning to FIG. 4, the main process proceeds to S500 after the PWM duty determination process in S400. In S500, the CPU executes a motor control process. Specifically, the CPU generates a PWM command value indicating the PWM duty set in S400. The CPU drives each of the switching elements Q1 to Q6 of the switching circuit 12 by use of the PWM command value. The motor 9 is thus rotated at a rotational speed corresponding to the PWM duty.

(6) Effects of Embodiment

With the electric power tool 1 of the embodiment as described above, it is configured to detect the motor 9 under the loaded condition, based upon variations of values of electric current of the motor 9. Accordingly, it is possible to detect precisely that the motor 9 is under the loaded condition.

Further, the electric power tool 1 of the embodiment does not exhibit a very large difference in values of electric current detected during unloaded and loaded states. Accordingly, it is difficult to detect precisely that the motor 9 is under the loaded condition if the detection is performed based upon a value of electric current (absolute value) as being performed conventionally.

In contrast, according to the embodiment, in order to detect that the motor 9 is under the loaded condition, a value of electric current of the motor 9 is not employed and a variation in values of electric current is employed. Accordingly, with the electric power tool 1 of the embodiment, it is possible to detect precisely that the motor 9 is under the loaded condition.

According to the embodiment, the motor 9 is detected to be in the loaded condition, based upon positive variations in values of electric current and a large variation in values of electric current, of the motor 9. Accordingly, highly precise detection of the motor loaded condition can be provided easily.

More specifically, according to the embodiment, it is configured to detect that the motor 9 has shifted to the loaded condition when the number of times that the a variation in a value of electric current is positive during the detecting period of time is greater than the threshold number of times A and when the total amount of variations in values of electric current during the detecting period of time is greater than the threshold total amount B. The motor 9 is detected to be under the loaded condition when the aforementioned two conditions are both satisfied, thereby enabling more precise detection of the motor 9 under the loaded condition.

According to the embodiment, the predetermined threshold number of times A and the predetermined threshold total amount B are set to different values before or after the predetermined period of time elapses from the startup of the motor 9. Accordingly, it is possible to set appropriate threshold values corresponding to the driving condition of the motor 9, thereby enabling further improvement in precision to detect that the motor 9 is under the loaded condition. Especially, according to the embodiment, both the threshold values A and B before the predetermined period of time elapses are set to relatively large values compared to the threshold values A and B after the predetermined period of time elapses. As a result, it is possible to effectively inhibit erroneous detection that the motor 9 is under the loaded condition when the motor 9 is instable immediately after the motor startup.

According to the embodiment, the control circuit 20 corresponds to an example of a controller of the present disclosure. The electric current variation detection portion 21 corresponds to examples of a physical quantity detector and a variation deriving portion of the present disclosure. The soft no-load detection portion 22 corresponds to examples of a loaded condition detector, an increase determination portion, a counter, a total amount calculation portion, a number of times threshold vale setting portion, and a total amount threshold value setting portion, of the present disclosure. The PWM generation portion 25 corresponds to an example of a driving output portion of the present disclosure.

[Other Embodiments]

(1) The threshold number of times A may be arbitrarily set to any value (number of times) that is one (1) or more. However, if the threshold number of times A set to "1", there is a possibility that the motor 9 is erroneously detected to be under the loaded condition. It is therefore preferable that the threshold number of times A is set to "2" or more.

Also regarding a variation in a value of electric current, not using the total amount of variations in values of electric current obtained plural times, it may be configured to determine that the motor 9 is (or probably) under the loaded condition by determining that a variation in a value of electric current at every information obtaining time exceeds a threshold value. In this case, the motor 9 is determined to be (or probably) under the loaded condition when the variation in the value of electric current at every information obtaining time exceeds the threshold value. However, there is a possibility that the motor 9 is erroneously detected to be under the loaded condition if only one variation in a value of electric current is referred to determine whether the motor 9 is under the loaded condition. It is therefore preferable to determine, based upon the total amount of plural variations in values of electric current, whether the motor 9 is under the loaded condition, as described in the above embodiment.

(2) It is a mere example to detect the motor 9 under the loaded condition based upon a variation in a value of electric current, and the motor 9 under the loaded condition may be detected based upon a variation in another physical quantity that is other than a value of electric current and indicates directly or indirectly the operation state of the motor 9.

For example, it is possible to detect that the motor 9 is under the loaded condition based upon a variation in an actual rotational speed of the motor 9, electric voltage applied to the motor 9, battery voltage, PWM duty for the feedback control, or the like.

Detection of the motor 9 under the loaded condition based upon PWM duty may be performed as described below. That is, when the motor 9 is started to be driven, the fixed rotational speed control is executed as the soft no-load control in which the motor 9 is continuously rotated at a fixed rotational speed. A PWM duty is maintained when the actual rotational speed of the motor 9 during the fixed rotational speed control reaches the target rotational speed. Subsequently, the fixed rotational speed control is continuously executed. When the PWM duty correction amount exceeds a predetermined threshold value, the motor 9 is determined to have shifted to the loaded condition and the soft no-load control is cancelled.

(3) The PWM duty reference value 50% employed when the motor 9 is not detected under the loaded condition is a mere example. The PWM duty reference value may be set to be variable based upon a voltage of the battery 3. For example, an approach is considered to increase the PWM duty reference value as the voltage of the battery 3 is low.

(4) With the soft no-load canceling determination process in FIGS. 5A and 5B, when the CPU determines in S330 that the predetermined period of time has not elapsed from the startup of the motor 9, the soft no-load canceling determination process may be terminated immediately. That is, it may be configured not to detect whether the motor 9 is under the loaded condition until the predetermined period of time elapses from the startup of the motor 9.

(5) According to the above embodiment, the information obtaining cycle and the control cycle are the same (synchronized); however they may be different from each other.

(6) A rotational speed of the motor 9 may be set continuously or in phases by an element other than the trigger 7, such as a dial. When a dial is provided to the electric power tool 1, it may be configured to determine in S310 of FIG. 5A validity/invalidity of the soft no-load control, based upon the dial operation position.

(7) The validity/invalidity of the soft no-load control may be configured to be set by other elements, such as a switch.

(8) According to the embodiment, the control circuit 20 of the electric power tool 1 is explanatorily configured with a microcomputer. However, it does not have to be limited to the microcomputer, and the control circuit 20 may be configured with, for example, ASIC, FPGA, or other various IC, logic circuits, or the like.

(9) The motor 9 of the above embodiment is a three-phase brushless motor but may be other motors (e.g., brushed DC motor, various AC motors).

(10) The motor-driven appliance according to the above embodiment is an electric power tool (specifically jigsaw). The motor-driven appliance may be various types of motor-driven appliances other than the electric power tool. For example, like a jigsaw, the motor-driven appliance may be a reciprocating saw in which a motor drives and reciprocates a blade to cut processed materials. Further, the motor-driven appliance according to the above embodiment may be a motor-driven appliance that has a structure other than a structure that an appliance element is reciprocated such as a jigsaw and reciprocating saw.

What is claimed is:

1. A motor-driven appliance comprising:
a motor;
an appliance element configured to be driven by the motor; and
a controller configured to control a driving output to drive the motor, the controller comprising:
a physical quantity detector configured to detect a physical quantity related to an operating state of the motor;
a variation deriving portion configured to derive a variation in the physical quantity based upon the physical quantity detected by the physical quantity detector;
a loaded condition detector configured to detect that the motor is under a loaded condition in which the motor is applied with a load based upon the variation derived by the variation deriving portion; and
a driving output portion configured to generate the driving output corresponding to whether the loaded condition is detected by the loaded condition detector, the driving output portion being configured to generate the driving output capable of driving the motor to drive the appliance element at a first speed when the loaded condition is not detected by the loaded condition detector and to generate the driving output capable of driving the motor to drive the appliance element at a second speed when the loaded condition is detected by the loaded condition detector, the first speed being a predetermined constant speed, and the second speed being higher than the first speed.

2. The motor-driven appliance according to claim 1, wherein the loaded condition detector is adapted to detect that the motor is under the loaded condition at least one of when the variation derived by the variation deriving portion is a positive value indicative of an increase in the physical quantity or when the variation is greater than a predetermined positive threshold value.

3. The motor-driven appliance according to claim 2, wherein the physical quantity detector is configured to detect the physical quantity at every predetermined detection time, the variation deriving portion is configured to derive at the every predetermined detection time a variation between a previous physical quantity detected by the physical quantity detector at a previous detection time of the every predetermined detection time and a current physical quantity detected by the physical quantity detector at a current detection time of the every predetermined detection time,
wherein the controller comprises: an increase determination portion configured to determine at the every predetermined detection time whether the variation derived by the variation deriving portion is a positive value; and a counter configured to count a frequency of increase that is the number of times that the increase determination portion determines that the variation derived by the variation deriving portion is the positive value within a detecting period of time between a detection time a predetermined period of time before a current detection time and the current detection time, and
wherein the loaded condition detector is configured to detect that the motor is under the loaded condition when the frequency of increase counted by the counter is greater than a predetermined threshold number of times.

4. The motor-driven appliance according to claim 2, wherein the physical quantity detector is configured to detect the physical quantity at every predetermined detection time, the variation deriving portion is configured to derive at the every predetermined detection time a variation between a previous physical quantity detected by the physical quantity detector at a previous detection time of the every predetermined detection time and a current physical quantity detected by the physical quantity detector at a current detection time of the every predetermined detection time,
wherein the controller comprises a sum calculator configured to calculate at the every predetermined detection time a sum of the variation derived by the variation deriving portion within a detecting period of time between a detection time a predetermined period of time before a current detection time and the current detection time, and
wherein the loaded condition detector is configured to detect that the motor is under the loaded condition when the sum calculated by the sum calculator is greater than a predetermined sum threshold value.

5. The motor-driven appliance according to claim 3, wherein the controller comprises a sum calculator configured to calculate at the every predetermined detection time a sum of the variation derived by the variation deriving portion within a detecting period of time between a detection time a predetermined period of time before a current detection time and the current detection time, and
wherein the loaded condition detector is configured to detect that the motor is under the loaded condition when the frequency of increase counted by the counter is greater than the predetermined threshold number of times and when the sum calculated by the sum calculator is greater than a predetermined sum threshold value.

6. The motor-driven appliance according to claim 2, wherein the controller further comprises a threshold number of times setting portion configured to switch the threshold number of times from a value used from the start of the motor driving by the driving output generated by the driving output portion until a predetermined time elapses to a value used after the predetermined time has elapsed, wherein these two values are different.

7. The motor-driven appliance according to claim 3, wherein the controller further comprises a sum threshold value setting portion configured to switch the sum threshold value from a value used from the start of the motor driving by the driving output generated by the driving output portion until a predetermined time elapses to a value used after the predetermined time has elapsed, wherein these two values are different.

8. The motor-driven appliance according to claim 4, wherein the controller further comprises a sum threshold value setting portion configured to switch the sum threshold value from a value used from the start of the motor driving by the driving output generated by the driving output portion until a predetermined time elapses to a value used after the predetermined time has elapsed, wherein these two values are different.

9. The motor-driven appliance according to claim 1, wherein the physical quantity detector is adapted to detect a current flowing to the motor as the physical quantity, and the variation deriving portion is adapted to derive a variation in the current detected by the physical quantity detector as the variation.

10. The motor-driven appliance according to claim 1, wherein the motor-driven appliance is a power saw and the appliance element is used in the power saw.

11. The motor-driven appliance according to claim 1, wherein the driving output portion is configured to generate the driving output having a predetermined constant duty ratio when the loaded condition is not detected by the loaded condition detector.

12. A motor-driven appliance comprising:
a motor;
an appliance element configured to be driven by the motor;
an operating portion configured to be operated by a user of the motor-driven appliance; and
a controller configured to control a driving output to drive the motor, the controller comprising:
a physical quantity detector configured to detect a physical quantity related to an operating state of the motor;
a variation deriving portion configured to derive a variation in the physical quantity based upon the physical quantity detected by the physical quantity detector;
a loaded condition detector configured to detect that the motor is under a loaded condition in which the motor is applied with a load based upon the variation derived by the variation deriving portion; and
a driving output portion configured to generate the driving output corresponding to whether the loaded condition is detected by the loaded condition detector, the driving output portion being configured to generate the driving output capable of driving the motor to drive the appliance element at a predetermined constant speed when the loaded condition is not detected by the loaded condition detector and to generate the driving output capable of driving the motor to drive the appliance element at a speed corresponding to an operation amount to the operating portion when the loaded condition is detected by the loaded condition detector.

13. The motor-driven appliance according to claim 12, wherein the driving output portion is configured to generate the driving output having a predetermined constant duty ratio when the loaded condition is not detected by the loaded condition detector.

14. The motor-driven appliance according to claim 12, wherein the driving output portion is configured to generate the driving output capable of driving the motor to drive the appliance element at a speed corresponding to an operation amount to the operating portion even if the loaded condition is not detected by the loaded condition detector when the operation amount does not reach to a predetermined operation amount.

15. The motor-driven appliance according to claim 12, wherein the speed corresponding to the operation amount to the operating portion when the loaded condition is detected by the loaded condition detector is higher than the predetermined constant speed when the loaded condition is not detected by the loaded condition detector.

16. The motor-driven appliance according to claim 12, wherein the motor-driven appliance is a power saw device and the appliance element comprises a blade used in the power saw device.

17. A motor-driven appliance comprising:
a motor;
a trigger configured to be pulled by a user of the motor-driven appliance;
a loaded condition detector configured to detect that a loaded condition in which the motor is applied with a load; and
a motor driver configured (i) to drive the motor at a first rotational speed corresponding to a pulling amount of the trigger in a case where the loaded condition is not detected by the loaded condition detector and the pulling amount is less than a predetermined amount, (ii) to drive the motor at a predetermined second rotational speed in a case where the loaded condition is not detected by the loaded condition detector and the pulling amount is the predetermined amount or more, and (iii) to drive the motor at a third rotational speed corresponding to the pulling amount in a case where the loaded condition is detected by the loaded condition detector, the second rotational speed being higher than the first rotational speed, and the third rotational speed being higher than the second rotational speed.

18. The motor-driven appliance according to claim 17, wherein the motor-driven appliance is a power saw device,
wherein the power saw device comprises a blade configured to be driven by the motor.

* * * * *